May 26, 1970  G. T. GALLO  3,513,846
URINARY TRACT IRRIGATOR
Filed March 29, 1967  2 Sheets-Sheet 1

INVENTOR
GEORGE T. GALLO

BY
COOCH and O'CONNELL
ATTORNEYS

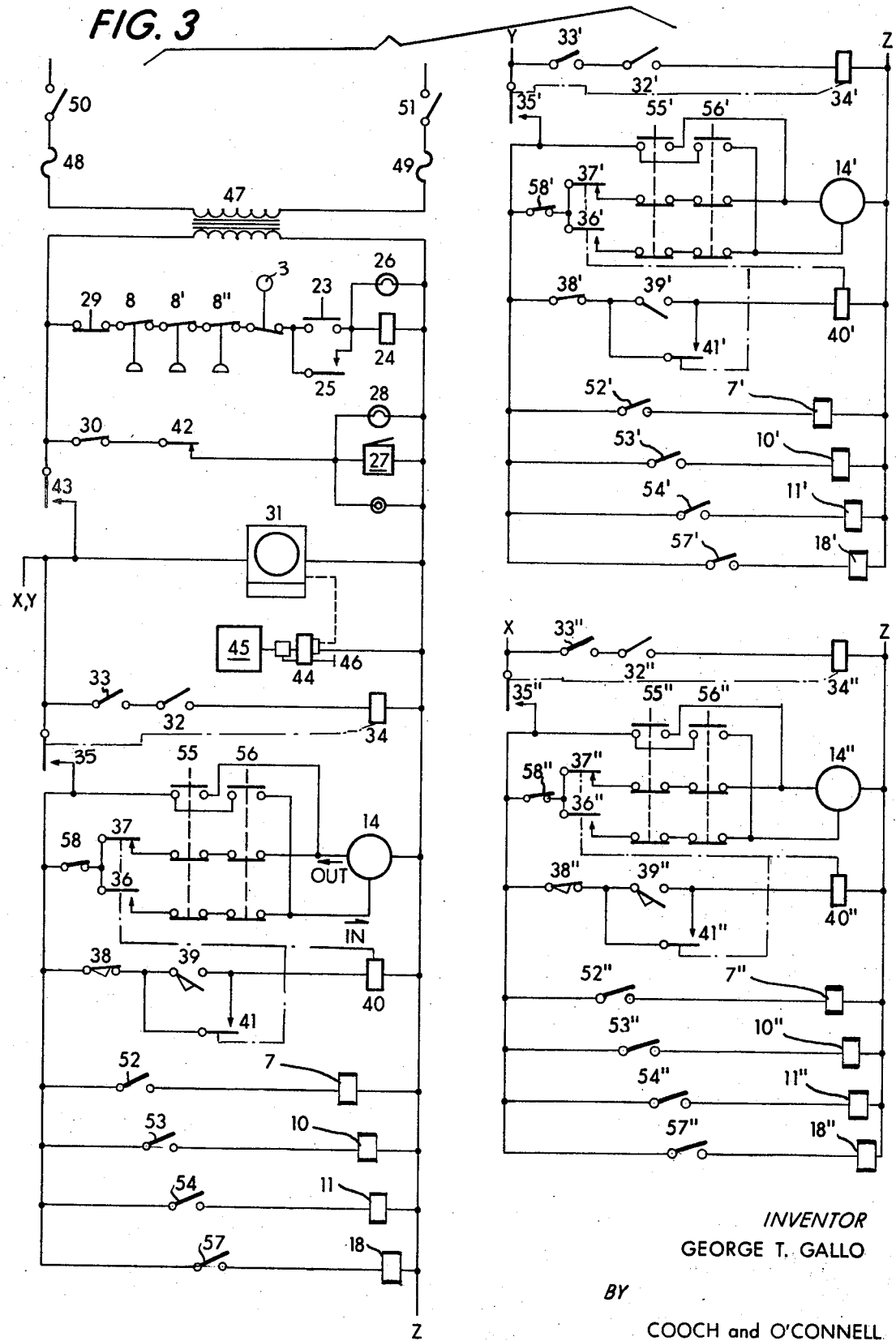

United States Patent Office
3,513,846
Patented May 26, 1970

3,513,846
URINARY TRACT IRRIGATOR
George T. Gallo, 15 Cataldo Drive,
Revere, Mass. 02151
Filed Mar. 29, 1967, Ser. No. 626,854
Int. Cl. A61m 1/00, 7/00
U.S. Cl. 128—234                              7 Claims

ABSTRACT OF THE DISCLOSURE

An apparatus for treating a body element with a substance, such as an apparatus for irrigating the urinary tract, wherein a predetermined volume of such substance is withdrawn from a storage means, the same predetermined volume is transferred to the body element at a constant flow and at a constant pressure, and the same predetermined volume is removed therefrom. An escape means is also provided to allow the removed substance to be passed out of the apparatus and the overall operation is performed automatically in sequence in a cyclic fashion.

---

This invention relates to apparatus and methods for irrigating the urinary tract; it is particularly concerned with a method for irrigating the bladder and kidneys of man.

Operations on, and infections in, the urinary system frequently produce conditions which make it necessary to flush or irrigate the bladder and/or the kidneys periodically. This may be accomplished by inserting a catheter through the urethra into the bladder and, if necessary, through a ureter to the kidney. By attaching a syringe or similar device to the external end of the catheter, a volume of liquid, e.g. saline solution or antibiotic solution, can be injected into the bladder or kidney and withdrawn again after a desirable time interval.

Not infrequently, it is necessary to provide both kidneys and the bladder with appropriate irrigation. In this event a piece of tubing is inserted substantially the length of the urethra and three catheters are passed through the tube. One catheter terminates in the bladder and the other two are passed through the right and left ureters to the kidneys. The irrigating fluids are injected and withdrawn through these catheters.

It is an object of the present invention to provide an efficient, safe and practical method for injecting and withdrawing irrigating fluids through a catheter or catheters which have previously been inserted into the urinary tract.

It is a further object of this invention to provide an apparatus which is particularly effective in carrying out said method.

It is a particular objective of this invention to provide an apparatus and method for the cyclic, automatic and sequential irrigation of the bladder and kidneys.

According to this invention, the method for irrigating the unriary tract comprises automatically and in predetermined sequence withdrawing from a liquid storage means a desired volume of liquid, transferring said desired volume of liquid into the urinary tract through an opening in a confined zone previously located within the urinary tract, allowing the transferred liquid to return through said opening and through said confined zone to a point external to the urinary tract, allowing the transfer liquid to escape from the system, and repeating the cycle at least once. Where it is desired to irrigate the bladder and both kidneys, the steps are carried out in triplicate, utilizing separate equipment for each series of steps except that a common liquid storage means may be employed. The volume of liquid will vary depending on whether the liquid is to irrigate the bladder or a kidney. Control means also are provided to allow one sequence to be complete before the next one starts, thus allowing maximum expansion of each catheter in the confines of the tube in the urethra.

An apparatus of the present invention comprises (a) liquid storage means, (b) withdrawal means for selectively withdrawing a predetermined volume of liquid from said liquid storage means, (c) transfer means for transferring said predetermined volume of liquid into a selected section of the urinary tract, (d) removal means for removing said predetermined volume of liquid from the urinary tract, those sections of said transfer means and said removal means for location within the urinary tract being a common structure, (e) escape means external to the urinary tract in said removal means to allow removed liquid to pass out of said apparatus, (f) control means to permit withdrawal means, transfer means, removal means and escape means to function in a predetermined sequence and to permit said sequence to be repeated at least once.

FIG. 3 is a schematic diagram of the electrical circuit of the present invention.

The inventive concept described herein may be incorporated into a variety of structures and arrangements. The apparatus presently described is set out as an illustration.

Figure 2:
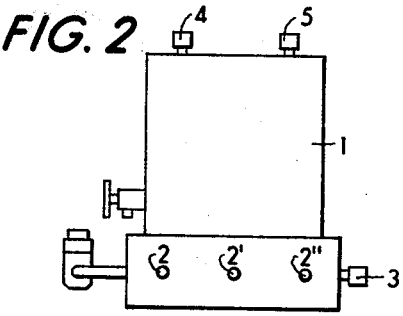
FIG. 2 is a side elevation of a liquid container forming part of the present invention.
Figure 1:
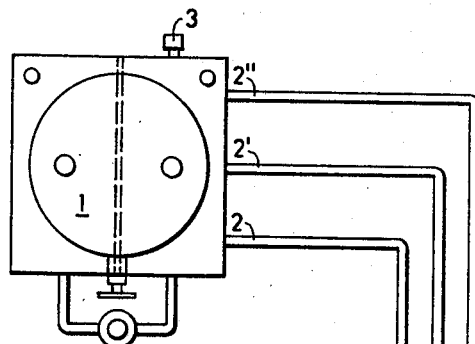
FIG. 1 is a top view of the apparatus of this invention exclusive of electrical circuit.
Figure 1:
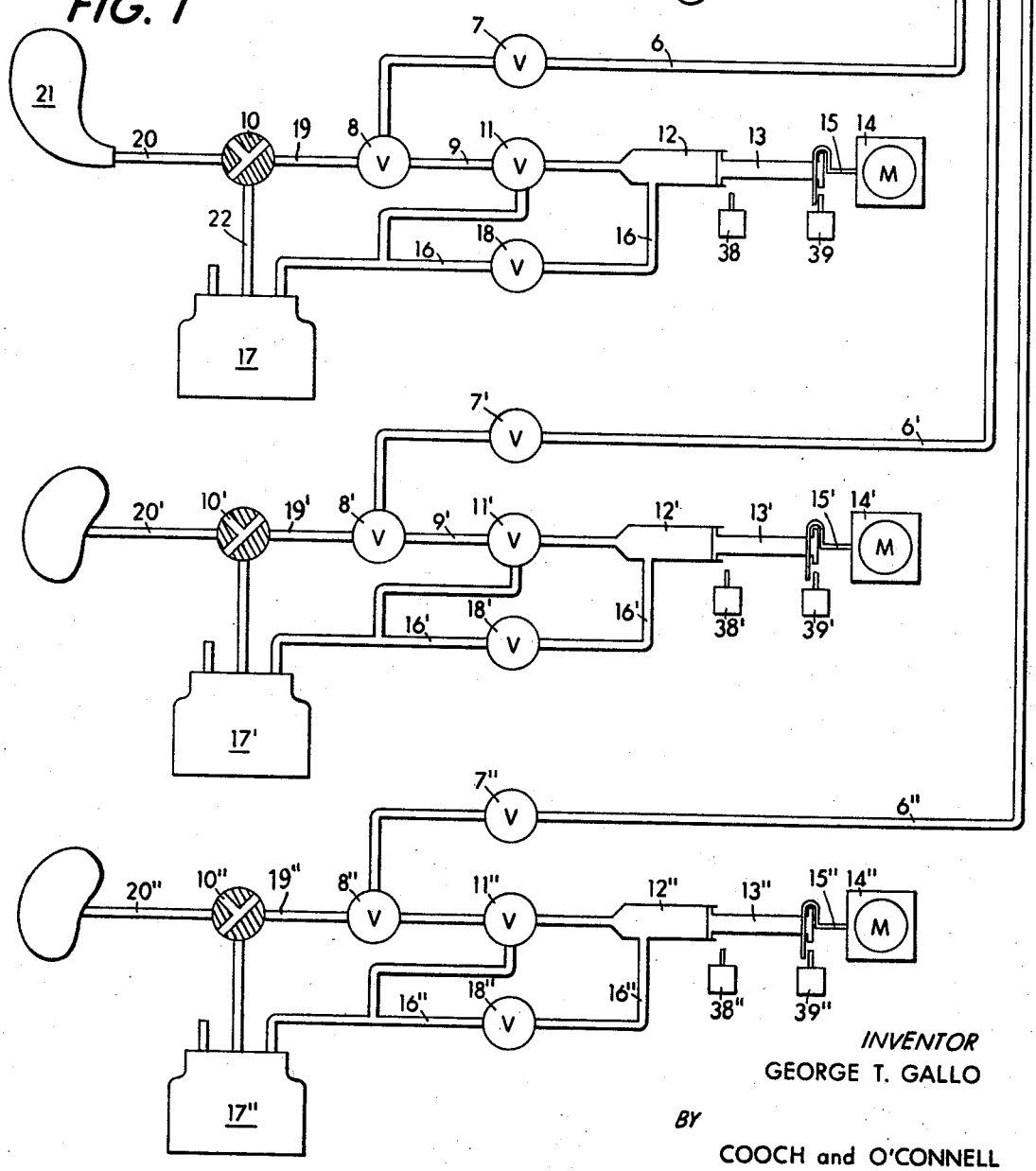

With reference to FIG. 1 which illustrates one embodiment of the invention, liquid container 1 is equipped with three liquid outlets 2, 2′ and 2″, a low level cut-out 3, air vent 4, and refill cap 5. Separate means are illustrated from the liquid outlets 2, 2′ and 2″ for irrigating the bladder, the left kidney and the right kidney. Because the separate means for irrigating are essentially identical, it will be convenient and sufficient to describe in detail one of them.

Liquid outlet means 2 is connected to tube 6 which is equipped with solenoid valve 7. Tube 6 is attached to pressure switch 8 and tube 9. Solenoid valves 10 and 11 are mounted in tube 9 on either side of pressure switch 8. The extension of tube 9 beyond valve 11 is connected to syringe 12; syringe plunger 13 is operated by electric stroke motor 14 and arm 15. Syringe 12 is provided with liquid outlet means 16 which allows liquid to pass from syringe 12 to drip jar 17, when solenoid valve 18 is open.

Solenoid valve 10 is normally maintained in a position which allows liquid to flow through tube 9 to extension 19 thereof and thence through catheter 20 into the patient's bladded 21. Solenoid valve 10 is constructed to allow liquid to flow freely from the bladder to drip jar 17 through tube 22 whenever the remainder of the apparatus cannot or does not function properly, e.g. through current failure.

A similar arrangement for irrigating a kidney is illustrated in FIG. 1 by the use of prime numbers for corresponding parts. A third arrangement for irrigating the second kidney is illustrated in FIG. 1 by the use of double prime numbers for corresponding parts. It has been found practical to irrigate the bladder with 30 cc. solution and to irrigate a kidney with 3 cc. Therefore, syringe 12 will normally be a 30 cc. syringe and syringes 12′ and 12″ will normally be 3 cc. syringes. In the event smaller volumes of liquid are desired, correspondingly smaller syringes may be used or motors 14, 14′, 14″ and arms 15, 15′ and 15″ can be adjusted in known manner to inspirate the smaller volumes into the syringe. Obviously larger syringes can be used, if desired, subject to proper adjustment of other controlling media.

Operation of the apparatus is best explained by reference to FIG. 3. Isolating transformer 47 is connected to a power source, which may be a conventional 110 volt alternating current. Transformer 47, as illustrated, is provided with fuses 48 and 49 and with toggle switches 50 and 51. As soon as the power source is turned on, audible alarm 27 and blinking light 28 are activated. Alarm 27 and light 28 may be turned off by opening normally closed toggle switch 30 or by pressing starter button 23. With pressure switches 8, 8' and 8" and low level cut-out 3 in normally closed position, pressing starter button 23 causes relay 24 to be energized. With relay 24 energized, normally open relay contact 25 is locked across 23 the opening in the circuit and normally closed relay contact 42 is opened, the latter action turning off alarm 27 and blinking light 28. Operating light 26 is turned on once the starter button 23 is pushed and remains on as long as relay 24 is energized.

As long as relay 24 is energized, normally open relay contact 43 is closed. This causes multi-circuit clock timer 31 to be set in motion. Timer 31 is a pin-type clock. In a typical arrangement, a twelve hour clock is equipped with a series of pins which can be individually pulled out so that each pin provides an electrical contact period of five minutes with two hundred and seventy second telechron motor 44. Within the five minute period the telechron motor 44 will cause drum 45 to make one complete revolution. Telechron motor 44 and drum 45 are equipped with zero release 46 so that the apparatus can be returned to its initial position without necessarily completing the full cycle first. By proper arrangement of contacts in drum 45, such as imbedded copper segments (not shown), drum switches 33, 33' and 33" are successively closed and opened, each drum switch completing its function and opening before the next one closes. The combination of timer 31, telechron motor 44 and drum 45 makes it possible to complete the irrigation of the bladder and both kidneys in 4½ minutes and to repeat it every five minutes indefinitely. The irrigation cycle can be repeated from one to one hundred and forty-four times every twelve hours by proper selection of the pins in timer 31.

When the drum circuit comes in contact with the appropriate copper segment it closes drum switch 33 and 58. Contact 32 energizes relay 34, causing relay contact 35 to close, permitting power to flow through the lower part of the circuit. With contact 58 closed, stroke motor 14 will start its outward movement because contact 37 is normally closed. Stroke motor 14 moves out until it hits and closes normally open switch 39. With switch 38 and switch 39 closed, relay 40 is energized, locking relay switch 41 across switch 39 and closing normally open relay switch 36, and opening contact 37. Stroke motor 14 now moves in the reverse direction. When stroke motor 14 hits the presently closed switch 38, it opens the switch causing relay 40 to be de-energized and motor 14 repeats its cycle. At the end of the two complete cycles of outward and inward travel, and 60 seconds later, motor 14 is disconnected from circuit.

In a typical operation, the drum circuit will be in contact with the copper segment energizing drum switch 33 for 75 seconds. During this time, additional copper segments are energized to first close drum switch 54 causing solenoid valve 11 to open while stroke motor 14 expels air from syringe 12. When drum switch 54 is no longer energized, drum switch 52 is energized and solenoid valve 7 opens. At about this time drum switch 53 is energized and solenoid valve 10 closes tube 22 and opens the passageway from tube 9 to extensions 19 and 20. Liquid is forced from the syringe 12 into the bladder and then sucked out of the bladder back to syringe 12. Drum switch 53 is no longer energized, but lower part of drum switch 54 is energized. Solenoid valve 11 which until now had remained open is now closed and solenoid valve 18 which until now had been closed is now opened by drum switch 57. Liquid which had been aspirated into syringe 12 is now allowed to flow through tube 16 to drip jar 17. If necessary, means can be provided to equalize the air pressure in syringe 12 as the fluid flows out. During these operations stroke motor 14 makes complete cycles while drum switches 52, 53, 54 and 57 are closed.

At this stage, drum 45 will have rotated to the point where drum switch 33 is no longer energized and drum switch 33' will be energized. This permits the operation of the circuit and cycle designed to irrigate the right kidney and indicated in the drawings by the corresponding prime number. After this the circuit and cycle designed by the double prime numbers and controlled through drum switch 33" are operative and irrigate the left kidney. By opening toggle switchs 32, 32' and 32" any one or more of these systems can be bypassed.

Pressure switches 8, 8' and 8" are designed to cuase an interruption in the electric circuit if the pressure needed in syringes 12, 12' and 12" to force the liquid into the selected organs is too high. This pressure increase can be caused by a blockage in the system, for example, and may indicate the need of prompt attention by a physician. Low level cut-off 3 is also designed to interrupt the electric circuit if the level of fluid in container 1 falls below a predetermined level. As indicated in FIG. 3, pressure switches 8, 8' and 8" and low-level cut-off 3 and stop button 29 are arranged so that any one can open the main electrical circuit, de-energizing relay 24, opening relay contacts 25 and 43 and closing relay contact 42. When relay contact 42 closes, alarm 27 and blinking light 28 are again operative to summon attention.

In the operation described, many modifications are possible without varying from the concept of the invention. For instance, stroke motor 14, which operates in both directions, can be replaced with two motors, each one designed to operate in only one direction. Push buttons 55 and 56 permit stroke motor 14 to be energized for trial test purposes.

What is claimed is:

1. An apparatus for irrigating a urinary track comprising:
    liquid storage means;
    withdrawal means for selectively withdrawing a predetermined volume of liquid from said liquid storage means;
    transfer means for transferring the same said predetermined volume of liquid into a selected section of the urinary tract at a constant flow and at a constant pressure;
    removal means for removing the same said predetermined volume of liquid from the urinary tract, those sections of said transfer means and said removal means for location within the urinary tract being a common structure;
    escape means external to the urinary tract in said removal means to allow removed liquid to pass out of said apparatus; and
    control means for causing said withdrawal means, said transfer means, said removal means, and said escape means to operate automatically in sequence in a predetermined cycle with each cycle defined by a single withdrawal of said predetermined volume of liquid from said storage means followed by a single transfer of said volume of liquid into said selected section of the urniary tract followed by a single removal of said volume of liquid from the urinary tract into said escape means.

2. An apparatus of claim 1 including fail-safe means to lock said removal means and escape means in open position substantially immediately whenever said transfer means is unable to transfer the predetermined volume of liquid.

3. An apparatus of claim 2 wherein said withdrawal means includes;
    means for selectively withdrawing a plurality of separate predetermined volumes of liquid for irrigating kidneys and bladder; and said transfer means comprises:
two catheters capable of terminating at the kidneys;
one catheter capable of terminating at the bladder; and
means for selectively directing two of said separate predetermined volumes of liquid for irrigating kidneys into the catheter capable of terminating at the kidneys, and another said predetermined volume of liquid for irrigating the bladder into the catheter capable of terminating in the bladder.

4. An apparatus of claim 3 wherein each catheter has separate escape means.

5. An apparatus of claim 4 wherein said separate predetermined liquid volumes for irrigating the kidneys are withdrawn into two syringes, each having a volume of approximately 3 cc. and said predetermined liquid volume for irrigating the bladder is withdrawn into a syringe having a volume of approximately 30 cc.

6. An apparatus of claim 5 wherein each escape means has collecting means for storing removed liquid.

7. An apparatus for treating a body element comprising:
means for storing a substance for treatment of said body element;
withdrawal means for selectively withdrawing a predetermined volume of said substance from said storing means;
tarnsfer means for transferring the same said perdetermined volume of substance to said body element at a constant flow and at a constant pressure;
removal means for removing the same said predetermined volume of substance from said body element;
escape means external to said body element in said removal means to allow said removed substance to pass out of said apparatus; and
control means for causing said withdrawal means, said transfer means, said removal means, and said escape means to operate automatically in sequence in a predetermined cycle with each cycle defined by a single withdrawal of said predetermined volume of liquid from said storage means followed by a single transfer of said volume of liquid into said body element followed by a single removal of said volume of liquid from said body element into said escape means.

References Cited

UNITED STATES PATENTS

| | | | |
|---|---|---|---|
| 2,956,511 | 10/1960 | Morehead | 103—211 |
| 3,335,724 | 8/1967 | Gienapp | 128—218 |
| 3,405,522 | 10/1968 | Tomita | 103—49 XR |
| 3,042,042 | 7/1962 | Blanck | 128—276 |
| 3,185,153 | 5/1965 | Leucci | 128—227 |
| 3,316,910 | 5/1965 | Davis | 128—227 |
| 3,329,147 | 7/1967 | Barron | 128—230 |

RICHARD A. GAUDET, Primary Examiner

R. L. FRINKS, Assistant Examiner

U.S. Cl. X.R.
74—110; 128—276